United States Patent
Jen

(10) Patent No.: US 8,318,842 B2
(45) Date of Patent: Nov. 27, 2012

(54) TITANIUM-CONTAINING PET COPOLYESTER RESIN SUITABLE FOR USE IN PRODUCING REFILLABLE LARGE VOLUME CONTAINER UP TO 20 LOOPS OF RETURNING

(75) Inventor: Zo-Chun Jen, Taipei (TW)

(73) Assignee: Nan Ya Plastics Corporation, Taipei (TW)

( * ) Notice: Subject to any disclaimer, the term of this patent is extended or adjusted under 35 U.S.C. 154(b) by 0 days.

(21) Appl. No.: 12/926,722

(22) Filed: Dec. 7, 2010

(65) Prior Publication Data
US 2011/0151160 A1 Jun. 23, 2011

(30) Foreign Application Priority Data

Dec. 18, 2009 (TW) .............................. 98143533 A

(51) Int. Cl.
*C08K 3/10* (2006.01)

(52) U.S. Cl. ........................ 524/413; 428/35.8; 524/440

(58) Field of Classification Search .................. 524/413
See application file for complete search history.

(56) References Cited

U.S. PATENT DOCUMENTS 6,783,827 B2 * 8/2004 Jen ............................. 428/35.7
2004/0122207 A1 * 6/2004 Jen ............................. 528/298

* cited by examiner

Primary Examiner — Doris Lee
(74) Attorney, Agent, or Firm — Bacon & Thomas, PLLC

(57) ABSTRACT

A titanium-containing PET copolyester has an intrinsic viscosity of 0.72-0.90 dl/g and a maximum amount of heat released during crystallization transition through a DSC analysis at a given heating rate of 20° C./min being less than 10 joules/gram, which contains polyethylene terephthalate as a major component and contains titanium component in an amount of 2-25 ppm based on the total copolyester weight, X mole % of isophthalic acid based on the copolyester, Y mole % of diethylene glycol based on the copolyester, Z mole % of 2,6-naphthalene dicarboxylic acid based on the copolyester, wherein X, Y, Z conforms to the following conditions:

$0 \leq X \leq 2.5$;

$1.0 \leq Y \leq 2.5$;

$0 \leq Z \leq 2.5$;

$2.5 \leq X+Y+Z \leq 7.5$;

and the PET copolyester is suitable for manufacturing an injection stretch blow molded refillable container having an inner volume of greater than 10 litters and capable of being returnable and refillable up to 20 loops of returning.

6 Claims, No Drawings

TITANIUM-CONTAINING PET COPOLYESTER RESIN SUITABLE FOR USE IN PRODUCING REFILLABLE LARGE VOLUME CONTAINER UP TO 20 LOOPS OF RETURNING

BACKGROUND

1. Field of the Invention

This invention relates to a titanium-containing PET copolyester excellent in heat resistance and transparency, particularly the titanium-containing PET copolyester suitable for manufacturing injection molded bottle preform having weight greater than 600 grams and thickness greater than 7.0 millimeters as well as an injection stretch blow molded refillable container having an inner volume of greater than 10 litters and capable of being returnable and refillable up to 20 loops of returning.

2. Description of Prior Art

As the public pay more attention to the quality of drinking water, many public places of company usually prepare distilled water contained in 5-gallon container for people to drink. Therefore, bulk water market is expanding gradually.

At present, this sort of bulk water container is mainly made from polycarbonate (PC). However, PC containers have been reduced in use gradually due to containing bisphenol-A harmful to human health as well as production costs generally more expensive.

A polyester represented by a polyethylene terephthalate (PET) is excellent in mechanical strength, chemical stability, gas barrier properties, hygienic properties, etc., is available at a relatively low cost and is light in weight, and thereby has been widely used as various packaging materials as e.g. bottles and films, or as fibers, etc. Such a polyester has been produced mainly by employing an antimony compound as a polycondensation catalyst.

And, a copolyester normally containing 0-3 mole % of isophthalic acid based on the copolyester or 1.5-4.0 mole % of diethylene glycol based on the copolyester is characterized in being easy to crystallize during inject-stretch-blow-molding process, so that such copolyester is only suitable to manufacture a thick-walled PET bottle preform having a thickness of about 3-4 millimeter and a weight of only about 100-120 grams maximum and a thick-walled PET bottle or container having an inner volume less than 5 litters. On the contrary, if the same copolyester is processed to manufacture a thick-walled PET bottle preform having a thickness of about over 7 millimeter and a weight of over 600 grams, a situation of crystalline haze unavoidably occurs to the manufactured bottle.

As a result, a PET bottle preform having crystalline haze occurred shall further cause a successive injection blowing process for producing a thick-walled PET bottle is then unstable; on the other hand, a cooling time needed to cool the produced bottle preform must be extended in order to prevent a situation of crystalline haze occurred on the bottle, while the cooling time if extended shall cause the PET bottle to be manufactured in lower productivity and economical invalidity.

For solving the aforementioned problem, U.S. Pat. No. 6,309,718 discloses a polyester composition for manufacturing a large molded polyester container weighing greater than about 200 grams and having an inner volume of several gallons. The polyester composition contains 4-10 mole % of cyclohexane dimethanol or 6-17 mole % of isophthalic acid or combination of the above both compounds; and, dicarboxylic acid compound such as naphthalene-2,6-dicarboxylic acid having a content of 50 mole % maximum is further added as a component of the polyester composition; the intrinsic viscosity of the copolyester is 0.75-0.85 dl/g.

For improving those polyesters or copolyesters mentioned above, the applicant had been granted an U.S. Pat. No. 6,913,806 which invented and disclosed a copolyester composition containing polyethylene terephthalate (PET) suitable to manufacture a thick-walled bottle preform having a weight of over 600 grams and a thickness of over 7.0 millimeter and a thick-walled container having an inner volume of over 10 litters, the main component of the copolyester composition being polyethylene terephthalate resin, the copolyester composition further containing X mole % of isophthalic acid based on the copolyester, Y mole % of diethylene glycol based on the copolyester, Z mole % of 2,6-naphthalene dicarboxylic acid based on the copolyester, wherein X, Y, Z conforming to the following conditions:

$$2.5 \leq X \leq 6.0;$$

$$2.5 \leq Y \leq 5.0;$$

$$0 \leq Z \leq 5.0;$$

the intrinsic viscosity of the copolyester is between 0.75 and 0.85 dl/g.

The commercial PET bottles having an inner volume of over 10 litters offered for sale on the market is usually a kind of returnable and refillable containers capable of refill after being returned and washed. The maximum loops of returning the commercial PET bottle capable of being returned, washed and refilled to maintain aesthetic and functional viability is about 15 loops, and the PET bottle shall be broken, cracked or deformed after over 15 loops of being returnable and refillable.

The commercial PET bottle if cracked or deformed normally is chopped into a small pieces of flakes and melted in higher melting temperature for recycling. But, since global warming and climate change is worsening day by day, it is a great urgency to effectively develop green energy technology to the surroundings for saving energy and reducing carbon.

SUMMARY OF THE INVENTION

In view of this, for the purpose of quickly achieving energy conservation and reduction of carbon emissions to effectively stop global warming and enhance environmental protection, it is an object of the invention to provide a modified copolyester composition which is derived from putting forth improvement on the copolyester composition disclosed on U.S. Pat. No. 6,913,806 and particularly using a titanium-containing compound to replace a traditional antimony-containing component as a polycondensation catalyst. The obtained copolyester composition of the invention has the following advantages:

1. The copolyester composition of the invention containing polyethylene terephthalate is suitable to manufacture a thick-walled bottle preform having a weight of over 600 grams and a thickness of over 7.0 millimeter and a thick-walled container having an inner volume of over 10 litters;

2. The thick-walled container made of the copolyester composition of the invention is excellent in uniform thickness, transparency and mechanical strength, which strength of the container is strong enough to contain over 10 liters of water, even 5 gallons of water;

3. The thick-walled container of the invention is capable of being returnable and refillable up to 20 loops of returning still to maintain aesthetic and functional viability since no crack or deformation is occurred;

4. The container of the present invention is easily stacked and free from deformation in the course of transporting, there is provided without the problem of bottle being broken during delivery;

5. The container of the present invention contains neither antimony compound nor bisphenol-A is harmless to human health; and 6. The container of the present invention which contains polyethylene terephthalate and is beneficial for a lower cost than that of polycarbonate (PC) container is going to replace the PC container gradually.

The modified copolyester composition of the invention is a titanium-containing copolyester resin, using a titanium-containing compound as a polycondensation catalyst in the polycondensation stage, which copolyester composition contains polyethylene terephthalate as a major component and contains titanium component in an amount of 2-25 ppm based on the total copolyester weight, X mole % of isophthalic acid based on the copolyester, Y mole % of diethylene glycol based on the copolyester, Z mole % of 2,6-naphthalene dicarboxylic acid based on the copolyester, wherein X, Y, Z conforms to the following conditions:

$0 \leq X \leq 2.5$;

$1.0 \leq Y \leq 2.5$;

$0 \leq Z \leq 2.5$;

$2.5 \leq X+Y+Z \leq 7.5$;

and the intrinsic viscosity of the copolyester is between 0.72 and 0.90 dl/g.

DESCRIPTION OF THE PREFERRED EMBODIMENT

The present invention resides in a titanium-containing copolyester resin containing polyethylene terephthalate (hereinafter abbreviated as PET copolyester) suitable for producing a bottle preform having a weight of over 600 grams and a thickness of over 7 millimeter by an injection machine as well as a container having an inner volume over 10 litters by using a stretch-blow-molding method. The container of the present invention contains no antimony compound is harmless to human health and particularly is capable of being returnable and refillable up to 20 loops of returning still to maintain aesthetic and functional viability since no crack or deformation is occurred. The present invention therefore conforms to the purpose of saving energy and reducing carbon.

The PET copolyester of the present invention contains polyethylene terephthalate as a major component and contains titanium component in an amount of 2-25 ppm based on the total PET copolyester weight, X mole % of isophthalic acid based on the PET copolyester, Y mole % of diethylene glycol based on the PET copolyester, Z mole % of 2,6-naphthalene dicarboxylic acid based on the PET copolyester, wherein X, Y, Z conforms to the following conditions:

$0 \leq Z \leq 2.5$;

$1.0 \leq Y \leq 2.5$;

$0 \leq Z \leq 2.5$;

$2.5 \leq X+Y+Z \leq 7.5$.

The process for producing the PET copolyester of the present invention is characterized in that a titanium-containing compound is selectively taken as a polycondensation catalyst.

The process for producing the PET copolyester of the present invention uses purified terephthalic acid (PTA) as a major dicarboxylic acid component, ethylene glycol (EG) as a major glycol component and other important components as raw materials and is effected via an esterification in the esterification stage and a polycondensation in the polycondensation stage which takes place in the presence of a titanium-containing catalyst.

Concretely, a slurry containing the purified terephthalic acid (PTA) and the ethylene glycol (EG) is first prepared, and then, the following components are further added and mixed into the slurry:

(A) isophthalic acid added in an amount of 0.1-2.5 mole % based on the final PET copolyester;

(B) diethylene glycol (DEG) added in a supplementary amount to make an accumulative total of diethylene isophthalic acid, including the amount of diethylene glycol spontaneously generated during melting polymerization, reached to 1.0-2.5 mole % based on the final PET copolyester, and (C) 2,6-naphthalene dicarboxylic acid provided with a content of no more than 2.5 mole % based on the final PET copolyester.

Accordingly, the total amount of the slurry prepared from containing isophthalic acid, diethylene glycol and 2,6-naphthalene dicarboxylic acid is between 2.5 mole % to 7.5 mole % based on the PET copolyester. And, the method of adding isophthalic acid and 2,6-naphthalene dicarboxylic acid to the slurry prepared from the purified terephthalic acid (PTA) and the ethylene glycol (EG) are directly added in a favorable amount therein, while the method of adding diethylene glycol to the slurry is only added in a supplementary amount, which is based on the reason if added up this supplementary amount of diethylene glycol and the produced amount of diethylene glycol spontaneously generated during reaction together, the total amount of diethylene glycol will reach a desired target content.

This aforementioned slurry is supplied to an esterification stage to proceed with an esterification reaction at reaction temperature ranging from 250° C. to 260° C. and under a processing pressure ranging from 0 kg/cm² to 2.0 kg/cm². Catalyst, heat stabilizer, toner, and other additives such as antioxidant, light stabilizer and lubricant shall be added before completion of the esterification reaction. Through the esterification stage, an esterification product is then obtained.

The obtained product in the esterification stage is supplied to the liquid phase polycondensation stage to proceed with a prepolymerization reaction at reaction temperature of ranging from 265° C. to 275° C. and at vacuum environment. After completion of the prepolymerization reaction, the obtained product through the prepolymerization reaction is continuously proceeded with a polycondensation reaction in which the reactant is heated to a reaction temperature of ranging from 275° C. to 285° C. under a reduced pressure of 1 ton vacuum intensity and in the presence of titanium component as a polycondensation catalyst to subject it to a polycondensation. The amount of titanium component added in polycondensation reaction is preferably 2-25 ppm based on the total PET copolyester weight. It is desirable that the intrinsic viscosity (IV) of the PET copolyester obtained from the polycondensation reaction is at least reached to 0.55 dl/g. Subsequently, the obtained PET copolyester is unloaded, cooled, and cut into column-shaped polyester chips by a cutter.

The PET copolyester obtained from aforementioned polycondensation is further undergone a solid state polymerization to raise the intrinsic viscosity of the copolyester up to 0.72-0.90 dl/g. In the course of proceeding with solid state polymerization, a continuous process to polymerize the PET copolyester is carried out by crystallization, drying and pre-heating up to 205-220° C. in a solid state polymerization tank, and a nitrogen gas is continuously led into the tank in order to get rid of the ethylene glycol and water produced by this reaction.

Use of titanium catalysts as a polycondensation catalyst is preferred, since both the hue and the transparency of the produced PET copolyester of the present invention are superior.

Differential Scanning calorimeters (DSC) is a thermoanalytical technique to measure temperatures and heat flows associated with thermal transitions in a material.

The present invention further utilizes a differential scanning calorimeter (DSC), manufactured by Perkin Elmer corporation, to analyze the final PET copolyester of the present invention. The test procedure is described as follows:
1. Taking about 3 mg of PET copolyester being solid state polymerized;
2. Heating up to 300° C. to melt the PET copolyester;
3. Maintaining 300° C. of the melted PET copolyester for 5 minutes;
4. Quickly cooling the melted PET copolyester down to room temperature;
5. Reheating at a given heating rate of 20° C./min to have the PET copolyester undergo phase transitions including glass transition, crystallization and melting, and these transitions involve energy changes or heat capacity changes that are detected by the DSC with great sensitivity.

Through aforementioned DSC analysis, the maximum amount of heat released (or called exothermic energy), if the PET copolyester of the present invention undergoes exothermic processes or during crystallization transition, is then sensitively measured.

Resulted in that the PET copolyester of the present invention has an outstanding property of which the maximum amount of heat released during crystallization transition is obviously less than 10 joules/gram, this value is far less than that of the general common copolyester suitable for producing a polyester bottle having a smaller inner volume. Normally, the maximum amount of heat released during crystallization transition for the general common copolyester is above 15 joules/gram, even higher than 25 joules/gram.

By an injection machine the PET copolyester of the present invention obtained from aforementioned solid state polymerization after dried is made into a bottle preform having a weight of over 600 grams and a thickness of over 7 millimeter. In practical embodiments, the weight of bottle preform is more preferably 600-800 grams, the thickness of bottle preform is more preferably 7.5-9.5 millimeter, the length of bottle preform is more preferably 36-42 cm, and the injection cycle time of bottle preform is preferably 90-130 seconds. The aforementioned bottle preform made from the PET copolyester of the present invention has excellent transparency without crystalline haze.

The bottle preform of the present invention is further manufactured into a container having an inner volume ranging from 10 litters to 20 litters by using stretch-blow-molding method which is well known to the art. The method uses near infrared light to heat up the bottle preform to a temperature of over glass transition temperature, and the stretch-blow-molding is best conducted while the temperature is 20-40° C. higher than glass transition temperature. The container made from the PET copolyester of the present invention has large inner volume as well as has excellent transparency and strength and is capable of being returnable and refillable for over 20 loops of returning so that the container of the present invention is very environmentally valuable.

The PET copolyesters respectively obtained from the following embodiments and comparative examples are provided for illustrating and demonstrating the effects of the present invention, it is to be noted that the scope of the present invention is not limited to the recited embodiments.

And, each of PET copolyesters has a maximum amount of heat released during crystallization transition capable of being measured using the aforementioned Perkin Elmer's DSC.

The Intrinsic Viscosity (IV) of the PET copolymers is analyzed by an Ubelohde viscosity meter at 25° C. in a mixed solvent of phenol and tetra-chloro ethane mixed in a ratio of 3:2.

Example 1

Measured 79.54 Kg of purified terephthalic acid (PTA), 2.04 Kg of isophthalic acid (IPA), 1.38 Kg of diethylene glycol (DEG), 2.98 Kg of 2,6-naphthalene dicarboxylic (2,6-NDC) and 37.78 Kg of ethylene glycol (EG), and then stirred together to form a well-distributed slurry which is then heated up to 260° C. to proceed with an esterification reaction, esterification pressure being maintained at 1.5-2.0 Kg/cm$^2$; while the esterification ratio reaches higher than 95%.

After the esterification reaction, a tetrabutyl titanate (TBT) is added as a polycondensation catalyst while the added amount of titanium is 6.0 ppm of the PET copolyester. Additionally, 6 grams of phosphoric acid is added as a heat stabilizer and a blue dye, e.g. blue 104, is also added in an amount of 1.0 ppm of the PET copolyester, respectively. Subsequently, raising the temperature up to 270° C. to proceed with pre-polymerization reaction, the reaction pressure being controlled at 760-20 torr;

After 1 hour of reaction, further raising the temperature up to 280° C., the vacuum intensity being decreased down to below 1 torr, proceeding with an polycondensation reaction until the intrinsic viscosity of reacted polymer reaching 0.60 dl/g; then, the reacted polymer is extruded through a die head, rapidly chilled, and cut into column-shaped copolyester chips.

The copolyester chips are loaded in a twin-awl revolving vacuum drying tank having an environment of 200-220° C. of temperature and lower than 1 ton of vacuum intensity to further proceed with a solid state polymerization reaction to raise the intrinsic viscosity of the copolyester chips up to 0.72 dl/g.

Analyzing the composition of the obtained PET copolyester, the IPA content thereof being 2.5 mole % based on the PET copolyester, the DEG content thereof being 2.5 mole % based on the PET copolyester and the 2,6-NDC content thereof being 2.5 mole % based on the PET copolyester.

For analyzing the amount of heat released during crystallization transition of the PET copolyester being solid-state polymerized, quickly heating up to 300° C. to melt the PET copolyester, then quickly cooling it down to room temperature, and reheating the cooled PET copolyester by a given heating rate of 20° C./min to have the PET copolyester completely undergo phase transitions.

The value of heat released during crystallization transition of the PET copolyester, obtained from the Perkin Elmer's DSC, is 7.1 joules/gram as listed in Table 1.

Subsequently, an injection and blowing machine is used to inject the final obtained PET copolyester at a melting temperature of 275-280° C. into a bottle preform having a weight of 685 grams, a thickness at bottle body of 8.5-9.0 millimeter, and a length of 410 millimeter. The bottle preform is further put into a stretch-blow-molding machine, at the temperature of the bottle preform raised to reach 110° C., to blow-molding the bottle preform into a container having an inner volume of 5 gallon. The process of stretch-blow-molding is stable.

The results of analyzing some physical properties to the bottle preform and the container are listed in Table 1. The bottle preform made from the PET copolyester has excellent transparency without crystalline haze. And, both the transparency and the strength of the 5-gallon container are all good, particularly the 5-gallon container through processes of returning, washing and refilling is capable of being returnable and refillable up to 20 loops of returning still to maintain aesthetic and functional viability due to no crack or deformation happened.

Example 2

Process is the same as that of Example 1, however, the composition of the obtained PET copolyester contains 2.5 mole % of IPA and 2.5 mole % of DEG based on the PET copolyester; the intrinsic viscosity of the PET copolyester is 0.81 dl/g after solid state polymerization.

As listed in Table 1, the heat released during crystallization transition of the obtained PET copolyester is 8.9 joules/gram; the bottle preform made from the same copolyester has good transparency without crystalling haze; and the 5-gallon container stably blow-molded from the manufactured bottle preform has both good transparency and good strength, moreover, the 5-gallon container is still capable of being returnable and refillable due to no crack or deformation happened after 20 loops of returning.

Example 3

Process is the same as that of Example 1, however, the composition of the obtained PET copolyester contains no IPA and 2,6-NDC, but contains 2.5 mole % of DEG based on the PET copolyester; the intrinsic viscosity of the PET copolyester is 0.9 dl/g after solid state polymerization.

As listed in Table 1, the heat released during crystallization transition of the obtained PET copolyester is 10.0 joules/gram; the bottle preform made from the same copolyester has good transparency without crystalling haze; and the 5-gallon container stably blow-molded from the manufactured bottle preform has both good transparency and good strength, moreover, the 5-gallon container is still capable of being returnable and refillable due to no crack or deformation happened after 20 loops of returning.

Example 4

Process is the same as that of Example 1, however, the composition of the obtained PET copolyester contains 1.5 mole % of IPA and 2.0 mole % of DEG based on the PET copolyester; the intrinsic viscosity of the PET copolyester is 0.84 dl/g after solid state polymerization.

As listed in Table 1, the heat released during crystallization transition of the obtained PET copolyester is 8.0 joules/gram; the bottle preform made from the same copolyester has good transparency without crystalling haze; and the 5-gallon container stably blow-molded from the manufactured bottle preform has both good transparency and good strength, moreover, the 5-gallon container is still capable of being returnable and refillable due to no crack or deformation happened after 20 loops of returning.

Example 5

Process is the same as that of Example 1, however, the composition of the obtained PET copolyester contains no IPA, but contains 2.0 mole % of DEG and 2.5 mole % of 2,6-NDC based on the PET copolyester; the intrinsic viscosity of the PET copolyester is 0.76 dl/g after solid state polymerization.

As listed in Table 1, the heat released during crystallization transition of the obtained PET copolyester is 9.0 joules/gram; the bottle preform made from the same copolyester has good transparency without crystalling haze; and the 5-gallon container stably blow-molded from the manufactured bottle preform has both good transparency and good strength, moreover, the 5-gallon container is still capable of being returnable and refillable due to no crack or deformation happened after 20 loops of returning.

Comparative Example 1

Process is the same as that of Example 1, however, antimony (Sb) is selectively added as a polycondensation catalyst while the added amount of antimony is 6.0 ppm of the PET copolyester. The composition of the obtained PET copolyester contains 5.0 mole % of IPA and 2.5 mole % of DEG based on the PET copolyester; the intrinsic viscosity of the PET copolyester is 0.83 dl/g after solid state polymerization.

As listed in Table 1, the heat released during crystallization transition of the obtained PET copolyester is 6.5 joules/gram; the bottle preform made from the same copolyester has good transparency but provides with crystalling haze due to uneven thickness of the bottle preform happened in injection process; and the 5-gallon container blow-molded from the manufactured bottle preform is incapable of being returnable and refillable due to crack or deformation happened after 15 loops of returning.

Comparative Example 2

Process is the same as that of Comparative Example 1, however, the composition of the obtained PET copolyester contains 2.4 mole % of IPA and 2.4 mole % of DEG based on the PET copolyester; the intrinsic viscosity of the PET copolyester is 0.84 dl/g after solid state polymerization.

As listed in Table 1, the heat released during crystallization transition of the obtained PET copolyester is 15.5 joules/gram; the bottle preform made from the same copolyester has crystalling haze and bad transparency; and the 5-gallon container blow-molded from the manufactured bottle preform should be further heated by near infrared light tube, resulted in that the 5-gallon container turns hazy and easily breaks during blow-molding process and is incapable of being returnable and refillable.

Comparative Example 3

Process is the same as that of Comparative Example 1, however, the composition of the obtained PET copolyester contains no IPA and 2,6-NDC, but contains 2.5 mole % of DEG based on the PET copolyester; the intrinsic viscosity of the PET copolyester is 0.9 dl/g after solid state polymerization.

As listed in Table 1, the heat released during crystallization transition of the obtained PET copolyester is 29.0 joules/gram; the bottle preform made from the same copolyester has crystalling haze and bad transparency; and the 5-gallon container blow-molded from the manufactured bottle preform should be further heated by near infrared light tube, resulted in that the 5-gallon container turns hazy and easily breaks during blow-molding process and is incapable of being returnable and refillable.

Result

1. Each PET copolyester respectively obtained from Examples 1-5 has an outstanding property of which the maximum amount of heat released during crystallization transition measured by DSC analysis at a given heating rate of 20° C./min is less than 10 joules/gram.
2. Each 5-gallon container produced from the PET copolyester respectively obtained from Examples 1-5 having good transparency and strength is capable of being returnable and refillable up to 20 loops of returning.
3. Each 5-gallon container respectively produced from Examples 1-5 contains no antimony compound is harmless to human health. Each 5-gallon container is very environmentally valuable.

TABLE 1 copolymer of examples 1-5 and comparative examples 1-3 and properties test of the copolymer and both preform and container made from the same

| Item | | Example | | | | | Comparative Example | | |
|---|---|---|---|---|---|---|---|---|---|
| | | 1 | 2 | 3 | 4 | 5 | 1 | 2 | 3 |
| Copolymer Formula (PET + IPA + DEG + 2,6NDC + A) | IPA mole % | 2.5 | 2.5 | 0 | 1.5 | 0 | 5.0 | 2.4 | 0 |
| | DEG mole % | 2.5 | 2.5 | 2.5 | 2.0 | 2.0 | 2.5 | 2.4 | 2.5 |
| | 2,6-NDC mole % | 2.5 | 0 | 0 | 0 | 2.5 | 0 | 0 | 0 |
| | polycondensation catalyst (A) | Ti 6 ppm | Ti 6 ppm | Ti 6 ppm | Ti 6 ppm | Ti 6 ppm | Sb 6 ppm | Sb 6 ppm | Sb 6 ppm |
| Properties | IV (dl/g) | 0.72 | 0.81 | 0.9 | 0.84 | 0.76 | 0.83 | 0.84 | 0.9 |
| | Heat released during crystallization (joules/gram) | 7.1 | 8.9 | 10.0 | 8.0 | 9.0 | 6.5 | 15.5 | 29.0 |
| Bottle Preform | Transparency test | good | good | good | good | good | good | poor | poor |
| | Crystalline haze test | no | no | no | no | no | yes | yes | yes |
| 5-gallon Bottle | no crack or deformation happened after 20 loops of being returnable and refillable | yes | yes | yes | yes | yes | no | no | no |

What is claimed is:

1. A titanium-containing PET copolyester resin, suitable for use in producing a refillable large volume container having an inner volume greater than 10 litres and capably returnable and refillable up to 20 loops of returning, comprising polyethylene terephthalate as a major component and contains titanium component in an amount of 10-25 ppm based on the total PET copolyester weight, X mole % of isophthalic acid based on the PET copolyester, Y mole % of diethylene glycol based on the PET copolyester, and Z mole % of 2,6-naphthalene dicarboxylic acid based on the PET copolyester, wherein X, Y, Z conforms to the following conditions:

$$0 \leq X \leq 2.5;$$

$$1.0 \leq Y \leq 2.5;$$

$$0 \leq Z \leq 2.5;$$

$$2.5 \leq X+Y+Z \leq 7.5;$$

and the PET copolyester has an intrinsic viscosity of 0.72-0.90 dl/g and a maximum amount of heat released during crystallization transition of the copolyester through a differential scanning calorimeter analysis at a given heating rate of 20° C./min being less than 10 joules/gram.

2. An injection molded bottle preform, made of the titanium-containing PET copolyester of claim 1, having weight greater than 600 grams and thickness greater than 7.0 millimeters.

3. The bottle preform as defined in claim 2, having weight, thickness and length between 600-800 grams, 7.5-9.5 millimeter and 36-42 cm respectively.

4. An injection stretch blow molded refillable container, made of the titanium-containing PET copolyester of claim 1, having an inner volume of greater than 10 litres and capable of being returnable and refillable up to 20 loops of returning.

5. A titanium-containing PET copolyester resin, suitable for use in producing a refillable large volume container having an inner volume greater than 10 litres and capably returnable and refillable up to 20 loops of returning, comprising polyethylene terephthalate as a major component and contains titanium component in an amount of 2-25 ppm based on the total PET copolyester weight, X mole % of isophthalic acid based on the PET copolyester, Y mole % of diethylene glycol based on the PET copolyester, and Z mole % of 2,6-naphthalene dicarboxylic acid based on the PET copolyester, wherein X, Y, Z conforms to the following conditions:

$$0 \leq X \leq 2.5;$$

$$1.0 \leq Y \leq 2.5;$$

$$0 \leq Z \leq 2.5;$$

$$2.5 \leq X+Y+Z \leq 7.5;$$

and the PET copolyester has an intrinsic viscosity of 0.72-0.90 dl/g and a maximum amount of heat released during crystallization transition of the copolyester through a differential scanning calorimeter analysis at a given heating rate of 20° C./min being less than 10 joules/gram.

6. A titanium-containing PET copolyeste of clam 5, which contains 6 ppm of titanium component.

* * * * *